United States Patent [19]

Mozer

[11] Patent Number: 5,657,380
[45] Date of Patent: Aug. 12, 1997

[54] INTERACTIVE DOOR ANSWERING AND MESSAGING DEVICE WITH SPEECH SYNTHESIS

[75] Inventor: Todd F. Mozer, Sunnyvale, Calif.

[73] Assignee: Sensory Circuits, Inc., Sunnyvale, Calif.

[21] Appl. No.: 534,635

[22] Filed: Sep. 27, 1995

[51] Int. Cl.$^6$ ................................. H04M 1/64
[52] U.S. Cl. ................... 379/88; 379/159; 379/102.01; 379/167; 340/565
[58] Field of Search .................. 379/102, 103, 379/67–89, 159, 160, 374, 167; 340/565

[56] References Cited

U.S. PATENT DOCUMENTS

| | | | |
|---|---|---|---|
| 5,142,564 | 8/1992 | Chu | 379/67 |
| 5,148,468 | 9/1992 | Marrick et al. | 379/67 |
| 5,289,534 | 2/1994 | Lester et al. | 379/103 |
| 5,406,618 | 4/1995 | Knuth et al. | 379/67 |
| 5,428,388 | 6/1995 | Von Bauer et al. | 379/103 |

*Primary Examiner*—Fan Tsang
*Attorney, Agent, or Firm*—Lumen Intellectual Property Services

[57] ABSTRACT

An automatic door answering and message system is disclosed. A preferred embodiment of the system has an interior unit and an exterior unit that communicate via an RF link. The system uses voice recognition and synthesis to interact with visitors. In addition to playing messages to and recording messages from visitors, the system also broadcasts to the inside their responses to predetermined queries, thereby permitting a resident to screen visitors in secret. Programmed dialogue scripts control the automated interaction between the machine and visitors. The system also has an intercom feature that enables the resident to talk with a visitor without opening the door. When the intercom is turned on, any automated dialogue script is interrupted. The system also includes a sensing means for sensing the open/closed state of the door, so that any automated dialogue script is interrupted by the opening of the door. Other embodiments include a telephone interface and a proximity sensor.

24 Claims, 8 Drawing Sheets

Screening Script

Messaging Script

Command Script

Record Script

Screen Script

INTERACTIVE DOOR ANSWERING AND MESSAGING DEVICE WITH SPEECH SYNTHESIS

FIELD OF THE INVENTION

This invention relates to communication and messaging devices. More particularly, it relates to interactive communication and messaging devices for use at the entrance to a building or room.

BACKGROUND OF THE INVENTION

There are numerous problems presently associated with receiving visitors at a home or office. When the resident is absent, there is often no message for visitors and no means for them to leave a message for the resident. This situation can be especially inconvenient when, for example, a delivery or repair person arrives. When the resident is present, on the other hand, there are also problems associated with receiving visitors. Some visitors may be unwelcome, for example, and it is often not evident that a visitor is a threat or an annoyance until after the door is open and it is too late.

In the past, there have been many intercom-type doorbell systems which enable a person to speak to a visitor at the front door before opening it. None of these intercom-type devices, however, has stored messaging features that make them useful when the resident is away from home or unavailable. They thus neglect to address many of the problems associated with receiving visitors.

U.S. Pat. No. 5,148,468 "Door answering system" issued Sep. 15, 1992 to Marrick et al discloses a door messaging system that records messages from visitors. This device, however, has no intercom capability for permitting the resident to speak with the visitor, nor does it have a screening capability whereby the resident can secretly monitor a message as it is being left by a visitor. Another disadvantage of this device is that, like many telephone messaging systems, its interaction with the owner is not intuitive or hands free, and its interaction with the visitor is limited to a single option. In addition, it is tape-based and therefore less robust and less versatile, and it requires custom wiring between the interior and exterior units.

U.S. Pat. No. 5,303,300 "Security door phone device" issued Apr. 12, 1994 to Eckstein discloses a device that calls a predetermined telephone when a visitor arrives at their door, thereby allowing residents to converse with the visitor via telephone, or let their telephone answering machine take a message. The answering machine can also be used to screen visitors just as answering machines are often used to screen telephone calls. This device, however, has several disadvantages. Because the system relies upon a telephone for the intercom feature, it does not permit the resident to converse with the visitor while the telephone is in use. In addition, because the telephone answering machine is used for both telephone and visitor messaging, if the telephone is in use when a visitor arrives, the visitor can not leave a message and the resident can not screen the visitor. Moreover, since the same machine is used for both phone and door answering, the two types of messages can become easily confused. This system is also not self-contained since the messaging feature can only be performed in combination with a telephone and a telephone answering machine. This complication also increases the likelihood that the system will malfunction. Additional disadvantages are that this system has, like most telephone answering machines, a primitive messaging system, it lacks interactivity, and it requires custom wiring between the interior and exterior units.

Most phone messaging devices have little or no automated interactivity with the caller or the resident. The flexibility of their interaction is limited since only one message is played to a caller and only one option is given to the caller: to record a message or not. Although the resident has more interactivity with the device through the use of several buttons corresponding to different functions, such interaction is not intuitive and often has peculiarities that vary from one machine to the next.

In recent years certain consumer devices have appeared that use speech synthesis or speech recognition to enhance interactivity with the user. For example, U.S. Pat. No. 5,406,618 "Voice activated, handsfree telephone answering device" issued Apr. 11, 1995 to Knuth et al discloses a telephone answering device that is activated by a proximity sensor and whose operation is controlled by simple voice commands by the resident. The device incorporates voice recognition circuitry to respond to spoken commands of the user that are elicited by a system generated voice request menu. The telephone answering device performs all the basic functions of a telephone answering machine in response to these simple commands and there is no need for the user to manually operate the telephone answering device.

This telephone answering device, however, is not designed for or capable of addressing the need for a door messaging and intercom system. Indeed, even if it were used in combination with the telephone intercom device of Eckstein, it still has serious problems with the intercom and messaging features due to its reliance on the telephone connection. Moreover, such a combination only enhances the interactivity of the resident with the machine, and does not enhance the interactivity of the visitor with the machine. The visitor is still faced with a primitive messaging system with no interactivity. No prior art messaging system has flexible and intuitive interactivity with the visitor or caller.

There remains a need, therefore, for a self-contained door communication and messaging device that has simple and intuitive interactivity with the visitor, that has messaging capability permitting incoming and outgoing messages to be easily recorded and played, that permits the resident to screen visitors, that permits the resident to speak with visitors without opening the door, that does not interrupt or get interrupted by the use of a telephone or telephone answering machine, that does not require wiring from the exterior to the interior, and that is inexpensive and easy to install.

OBJECTS AND ADVANTAGES OF THE INVENTION

Accordingly, it is an object of the present invention to provide an inexpensive and self-contained door communication and messaging device that is simple and intuitive to operate for both the resident and the visitor, and is easy to install. It is another object of the invention to provide a door communication and messaging device that uses speech recognition and synthesis to enhance the ease of interaction with visitors and permit the resident to easily screen visitors. It is an additional object of the present invention to provide a door communication and messaging system that allows the resident and visitor to easily converse without opening the door and that does not require wiring between an exterior and interior unit. Another object of the invention is to provide a device for recording voice messages left by visitors arriving at a building, office, residence, or the like. Yet another object of the invention is to provide a door communication and messaging device that is automatically activated by the physical presence of a visitor near a door.

These and other objects and advantages are achieved by applying the known technologies of voice recognition, voice synthesis, digital recording, integrated circuitry, and wireless communication to the area of door communication and messaging, thereby producing a new device for door messaging and communication whose features are not present in the prior art or in any obvious combination thereof. This new device is designed in such a way that it can be manufactured at a price significantly below that previously achievable for devices having similar components.

SUMMARY OF THE INVENTION

The objects and advantages of the invention are achieved by a communication and messaging system for use between an interior space, such as inside a home, and an exterior space, such as the front porch. The system includes a sensing means, such as a button or proximity sensor, for recognizing the presence of a visitor in the exterior space; a speech generation means, such as a speech synthesizer, for posing a prompting question to the visitor in accordance with a dialogue script; a record and playback means for digitally recording and playing back a message spoken by or to the visitor; an interior broadcast means for broadcasting in the interior space words spoken by the visitor, the prompting question, or the message spoken by the visitor; an exterior broadcast means for broadcasting in the exterior space words spoken by a resident in the interior space; and control means responsive to the sensing means, to the speech recognition means, and to the dialogue script, for controlling the speech generation means, the record and playback means, and the interior broadcast means. The invention can further include a speech recognition means for recognizing a verbal response spoken by the visitor.

In a preferred embodiment, the system is divided into an interior unit located in the interior space and an exterior unit located in the exterior space and comprises a communication means, such as a RF or wire link, for transmitting signals between the interior unit and the exterior unit. These signals can be control signals indicating, for example, buttons being pushed, prompting questions, verbal responses, messages, words spoken by the visitor, or words spoken by the resident. The preferred embodiment also includes an interior button located in the interior space for the resident to push. The control means in this case is further responsive to the interior button. In the preferred embodiment the record and playback means is further used for digitally recording and playing back an outgoing message spoken by the resident, and the exterior broadcast means is used further for broadcasting in the exterior space the outgoing message. The preferred embodiment also includes an interior sensing means, such as a button, for recognizing the presence of the resident in the interior space; and uses a speech generation means for posing prompting questions to the resident in accordance with a dialogue script. The preferred embodiment also uses a speech recognition means for recognizing verbal commands spoken by the resident. A door sensing means for sensing an open/closed state of a door is also included in the preferred embodiment, as is a music synthesis means for generating music in the exterior space. The preferred embodiment also includes a clock for recording a time at which the message is recorded, and uses the speech generation means to verbally announce the time.

In the preferred embodiment, a single integrated circuit is used for performing speech synthesis, music synthesis, speech recognition, and digital audio recording and playback. In an alternate embodiment, two such integrated circuits are used, one in each unit.

In another embodiment, the interior unit is portable and is integrated with a common remote control device. The interior unit can also be equipped with a volume control means for controlling the volume of the interior broadcast means.

In yet another embodiment, the system includes a telephone interface for establishing communication between the system and a telephone. In this embodiment the control means is further responsive to the telephone interface.

DETAILED DESCRIPTION

Figure 1:
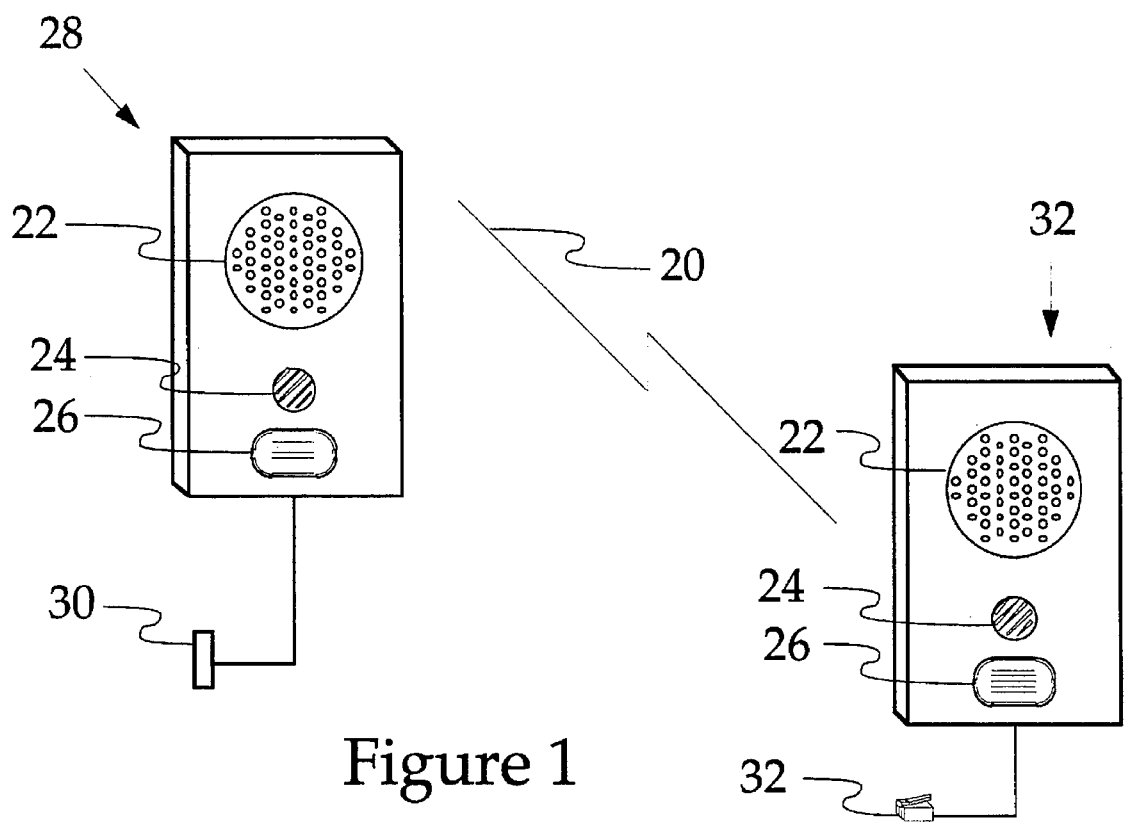
FIG. 1 is a perspective drawing of the interior and exterior units of the preferred embodiment.

A preferred embodiment of the invention is a communication and messaging system composed of two units, as shown in FIG. 1. The two units communicate audio and command data via an RF link 20. The outer appearance of each unit is very simple, with a single speaker 22, a single microphone 24, and a single button 26. Inside each unit is a printed circuit board (not shown) supporting an integrated circuit and other electronic components. The exterior unit 28 has an sensing means 30 that senses the open/closed state of a door (not shown). In one embodiment, the interior unit 32 has a telephone interface 32 that enables the unit to interact via telephone with both the resident and callers.

Figure 2:
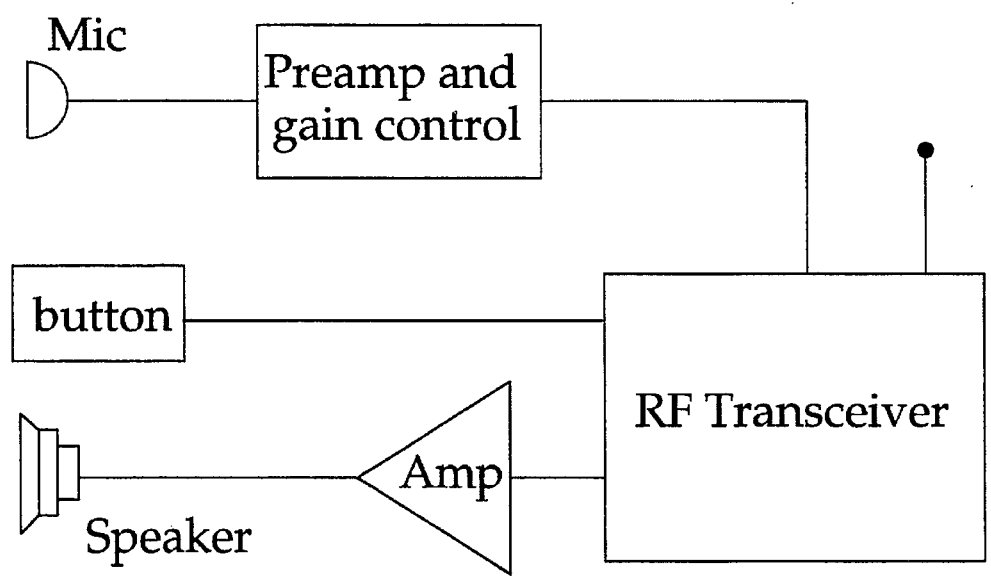
FIG. 2 is a block diagram of the circuitry inside the exterior unit of the preferred embodiment.

A block diagram of the circuitry inside the exterior unit is shown in FIG. 2. A microphone picks up audio signals which are amplified and then transmitted by an RF transceiver to the interior unit. The RF transceiver also transmits a signal when a button is pressed. When the RF transceiver receives signals from the interior unit, they are amplified and sent to a speaker. The exterior unit, therefore, is essentially a customized two-way radio. It can be powered by either a battery or an external power source. In order to save energy, the RF transceiver and amplifiers automatically turn off if there is no activity after a predetermined time period, e.g. one minute. When the button is pressed, they are turned on again. The circuitry to implement such a feature is simple and well-known to those skilled in the art.

Figure 3:
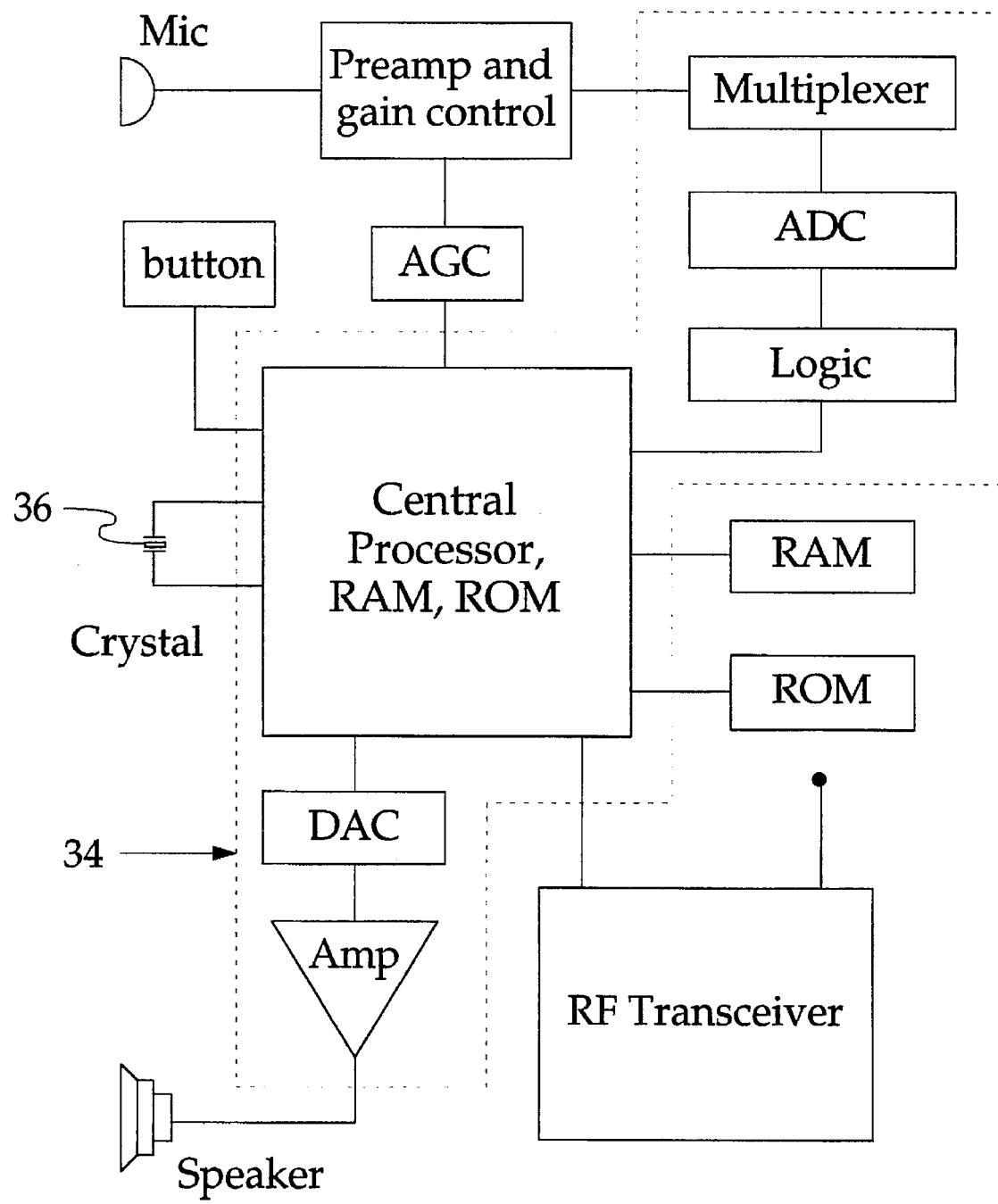
FIG. 3 is a block diagram of the circuitry inside the interior unit of the preferred embodiment.

A block diagram of the circuitry inside the interior unit is shown in FIG. 3. At the heart of the system is an RSC-164 audio processor chip 34 available from Sensory Circuits of San Jose, Calif. Among other things, the RSC-164 chip is capable of speech synthesis, speech recognition, music synthesis, digital audio recording, digital audio playback, and script processing. There is a small RAM on-chip for short term calculation and storage, and a small ROM on-chip for storing the programs for performing speech recognition, synthesis, etc. The chip operates at a clock speed determined by a crystal 36. A mic receives audio signals and sends a corresponding electrical signal to a preamp and gain control circuit. This circuit is controlled by an automatic gain control (AGC) circuit that is, in turn, controlled by the RSC-164 chip. After being amplified by the preamp, the electrical signal enters the RSC-164 chip where it passes through a multiplexer and an analog-to-digital converter. The resulting digital signal then passes through a logic circuit and enters the processor for recording or recognition. Another input signal to the RSC-164 chip is generated by a simple button.

For playing messages or for playing synthesized music or speech, a speaker is connected to the chip. A digital-to-analog converter and an amp on the chip are used to drive the speaker. Another connection to the chip links it to an RF transceiver tuned to communicate with the transceiver in the exterior unit. Also connected to the chip is an off-chip random-access memory (RAM) and an off-chip read-only memory (ROM). The RAM stores audio data for incoming and outgoing messages as well as other data. The ROM contains audio, command and program data for the unit. The audio data enables it to recognize many words such as "yes", "no", "playback", "record", "screen", and "time". The ROM also contains voice data for the prestored greeting message, good-bye message and screening queries to be addressed to a visitor, as well as voice data for prompting commands such as playing back recorded messages, recording a new greeting, and setting the time. In a more versatile and more expensive embodiment with significantly more off-chip RAM, the greeting message, good-bye message and screening queries can be customized by the resident, over-riding the prestored messages in ROM.

Figure 4:
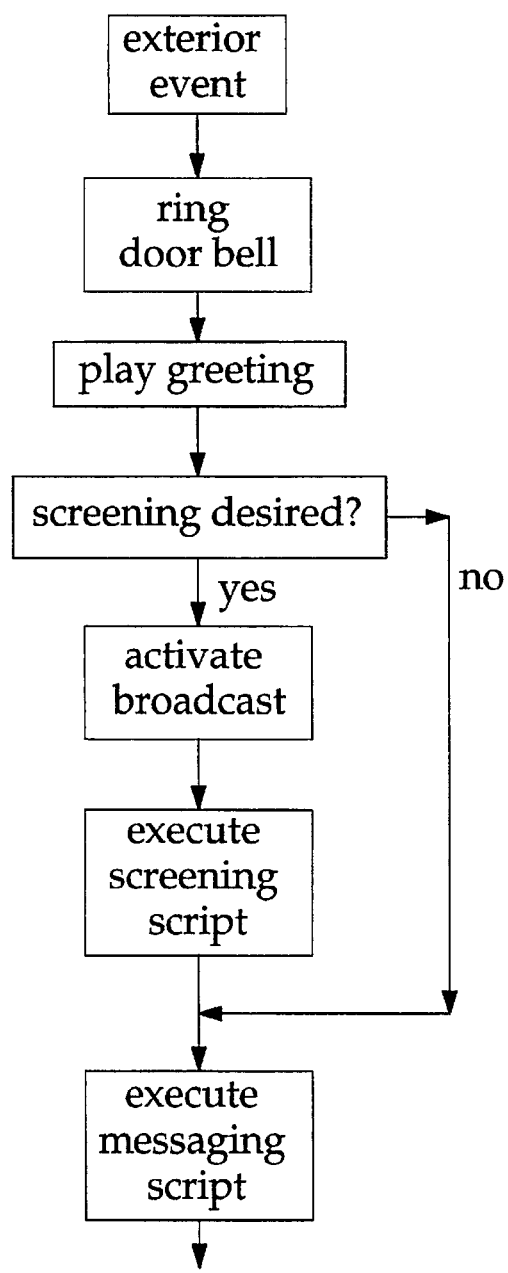
FIG. 4 is a flow diagram of the exterior event script according to the invention.
Figure 6:
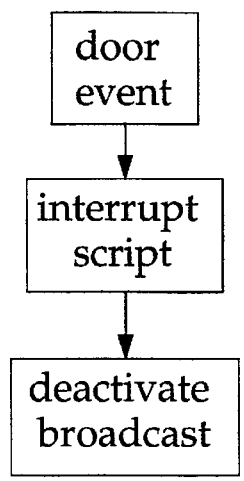
FIG. 6 is a flow diagram of the door event script according to the invention.

In addition to speech data, the off-chip ROM contains script data that controls the interaction of the system with the resident and with visitors. When an event occurs, a corresponding script is executed. FIG. 4 is a flow chart of the script that is executed in response to an exterior event such as the pushing of the button on the exterior unit by a visitor at the door of a residential home. In response to the exterior event, a door bell sound is generated on the speaker of the interior unit to alert the resident that a visitor has arrived. A greeting message is then played to the visitor on the outside unit. If the screening function is turned off, the exterior event script turns control over to the messaging script which will be described below in reference to FIG. 8. If the screening function is turned on, then a broadcast feature of the system is activated whereby words spoken by the visitor into the microphone of the exterior unit are broadcasted over the speaker of the interior unit. In addition, screening queries directed to the visitor are also broadcasted. This feature allows the resident to obtain information about the visitor without the visitor knowing whether or not anyone is home. The screening queries are determined by a screening script described below in reference to FIG. 7. After the screening script is executed, control is turned over to the messaging script. As illustrated in FIG. 6, in the event that the door is opened (presumably by the resident), any script that is presently being executed is interrupted and the broadcast function is deactivated.

Figure 8:
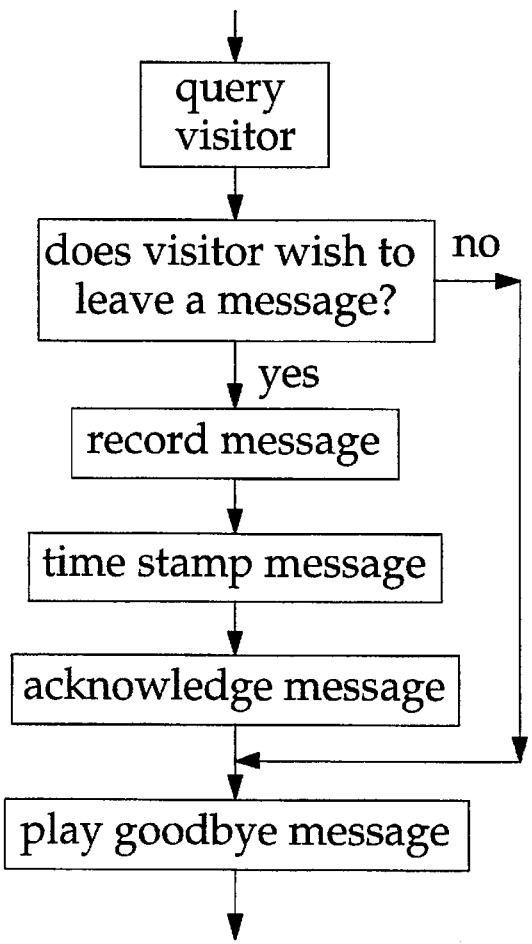
FIG. 8 is a flow diagram of the messaging script according to the invention.

A flow chart of the messaging script is shown in FIG. 8. First a query is played to the visitor asking, for example, "Would you like to leave a message?" If the visitor answers "no" then a good-bye message, for example, "Thank you for visiting" is played and the script ends. If the visitor answers "yes" to the query then the visitor is instructed to begin speaking after a beep. The system produces a beep and begins recording a message. After the message is recorded, the time and date of the message is recorded as well. The system then acknowledges that a message has been recorded, for example, by broadcasting to the exterior unit speaker "I will announce that you have visited and left a message." The unit then plays the good-bye message and the script ends.

Figure 7:
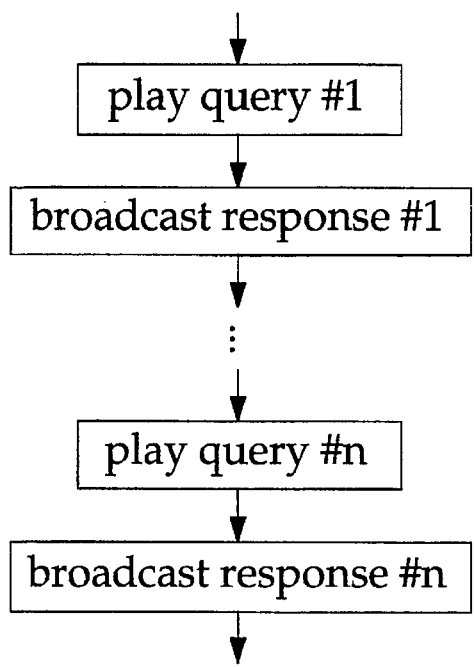
FIG. 7 is a flow diagram of the screening script according to the invention.

A flow chart of the screening script is shown in FIG. 7. First a greeting message is played to the visitor on the speaker of the exterior unit, for example, "Hello, this is ADAM, the automated door answering and messaging system." Then a first query, for example, "Whom may I say is visiting?" is played. The system then broadcasts the response to the query over the speaker on the interior unit. This is repeated for a number of queries and then the screening script ends. Other queries that the system can play are, for example, "Whom do you wish to visit?" and "What is the purpose of your visit?"

Figure 5:
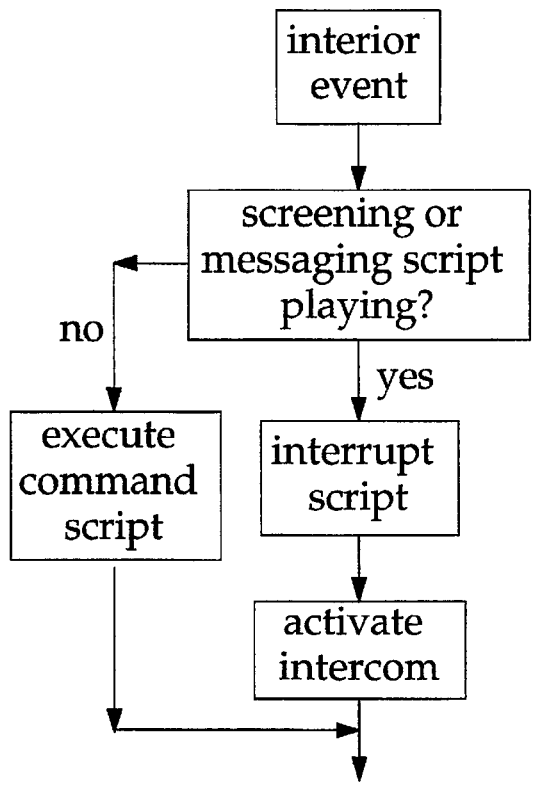
FIG. 5 is a flow diagram of the interior event script according to the invention.

In the event that the interior button is pressed by the resident, an interior event script is executed. A flow chart for this script is shown in FIG. 5. First the system determines whether or not a screening or messaging script is presently being executed. If so, then the script is interrupted and an intercom feature of the system is activated whereby the resident can interact with the visitor without opening the door. If a script is not presently being executed, then it is assumed that no visitor is present and a command script is executed.

Figure 9:
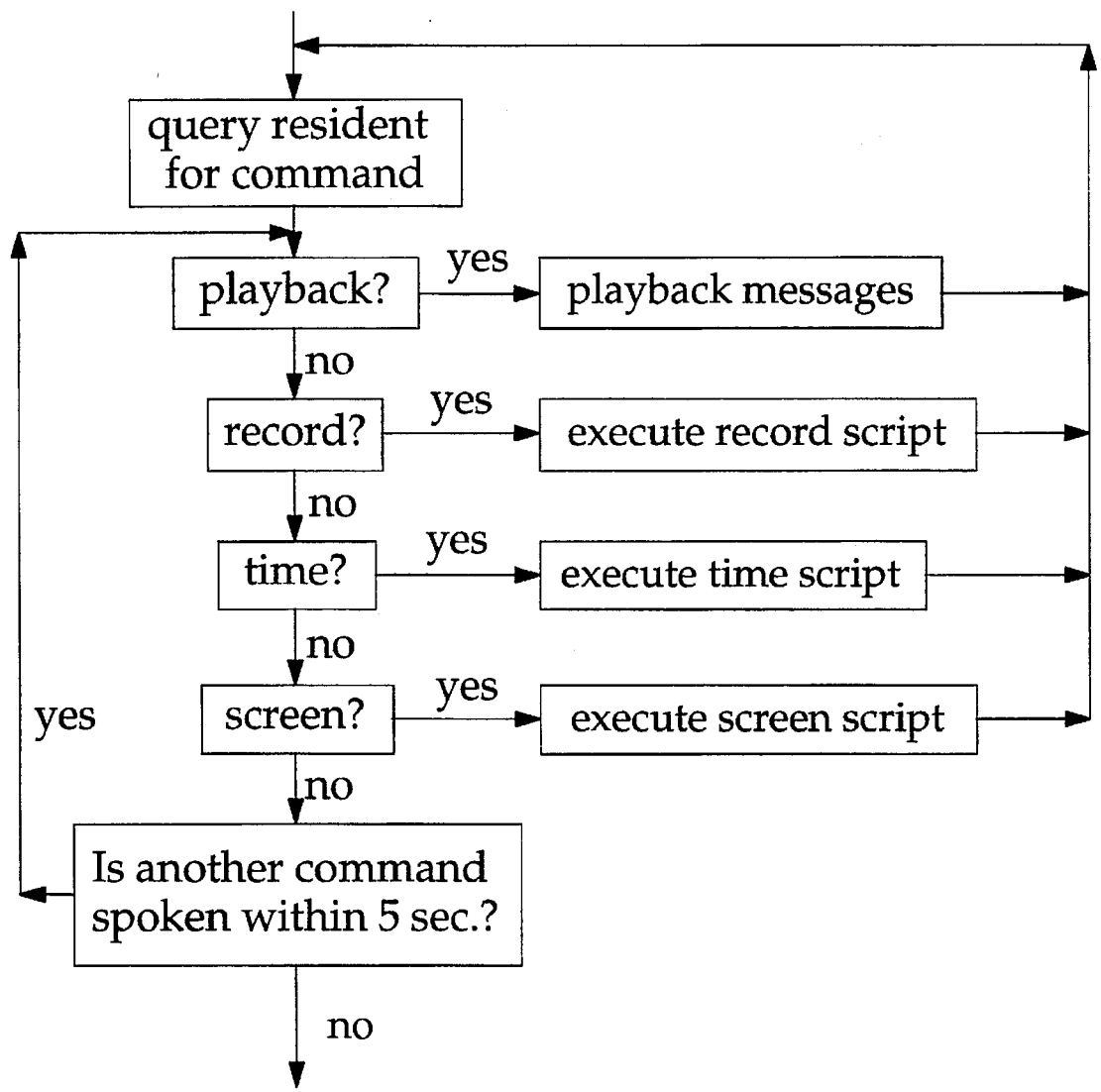
FIG. 9 is a flow diagram of the command script according to the invention.

A flow chart for the command script is shown in FIG. 9. The system queries the resident for a command. If one of several predetermined commands is recognized, then a corresponding script is executed or a corresponding action is taken. If the resident says "playback", then the unit plays back any message left by visitors. In response to the "record", "time" and "screen" commands, the unit executes corresponding scripts described below in reference to FIGS. 10, 11 and 12, respectively. After five seconds with no response, the command scripts ends.

Figure 10:
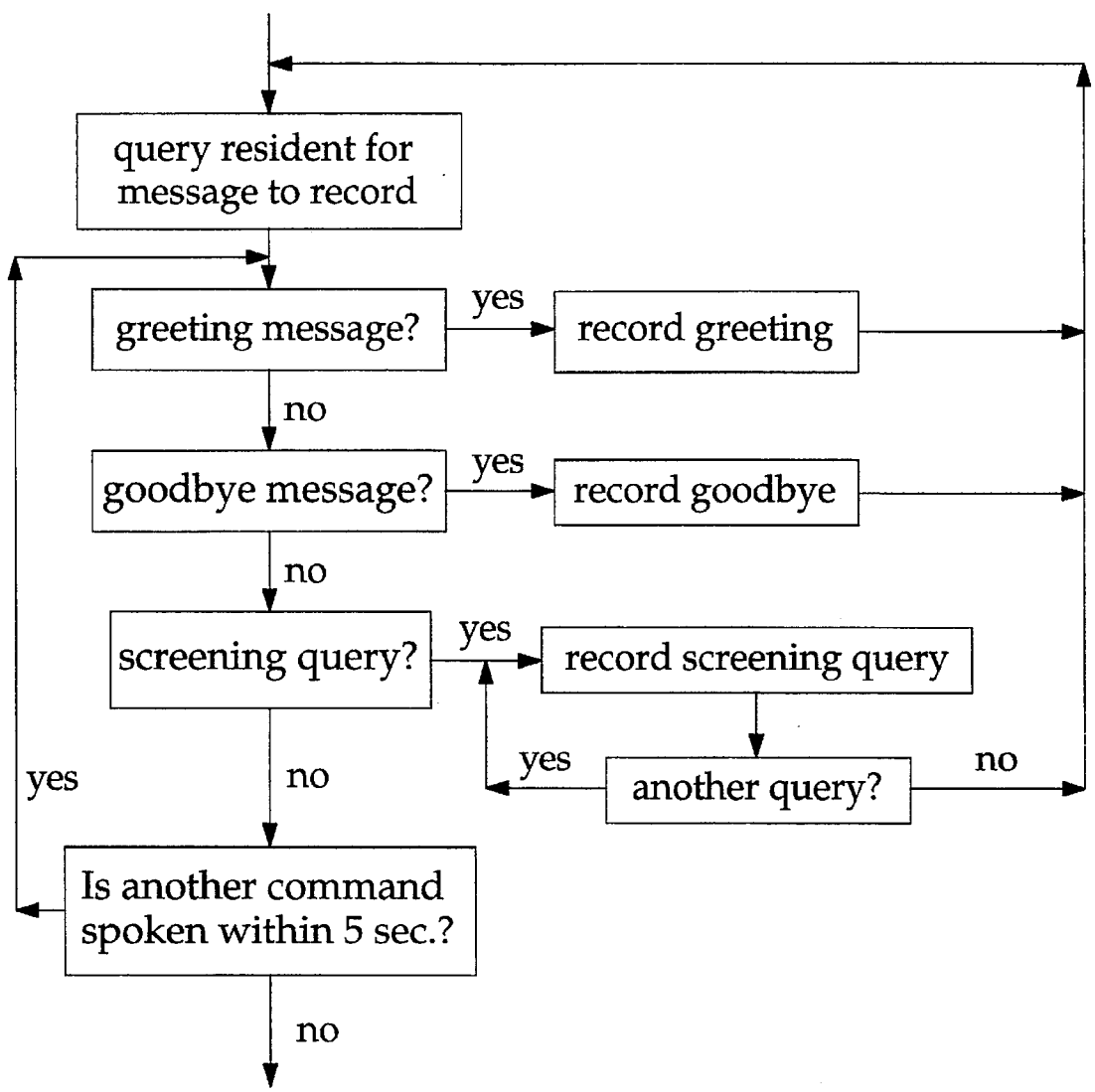
FIG. 10 is a flow diagram of the record script according to the invention.

A flow chart for the record script is shown in FIG. 10. First the unit asks what kind of message the resident wishes to record. If the resident replies "greeting" then the unit tells the resident to begin recording at the beep, beeps, and begins recording. When finished recording, the script returns to the beginning and asks what kind of message the resident wishes to record. If the resident replies "good-bye" then the unit records a good-bye message in a manner analogous to the way it recorded the greeting and returns to the beginning of the script. If the resident asks to record a screening query by replying "screening", then the unit records a screening query and asks if the resident wishes to record another screening query. If the resident answers "yes", then another screening query is recorded in addition to the previous one and the unit asks again if the resident wishes to record another screening query. If the resident answers "no" then the unit returns to the beginning of the script. This script is operative in the embodiment containing additional RAM for custom messages. In the preferred embodiment an alternate script is executed that allows the user to select among several predetermined messages by simply saying "yes" or "no" after each query is played. This embodiment requires less RAM for storing customized messages. In the preferred embodiment, the greeting message can be customized but the other messages can not. In this case, the record command assumes that the greeting will be recorded. In the preferred embodiment, recording a greeting automatically turns the screen feature off.

Figure 11:
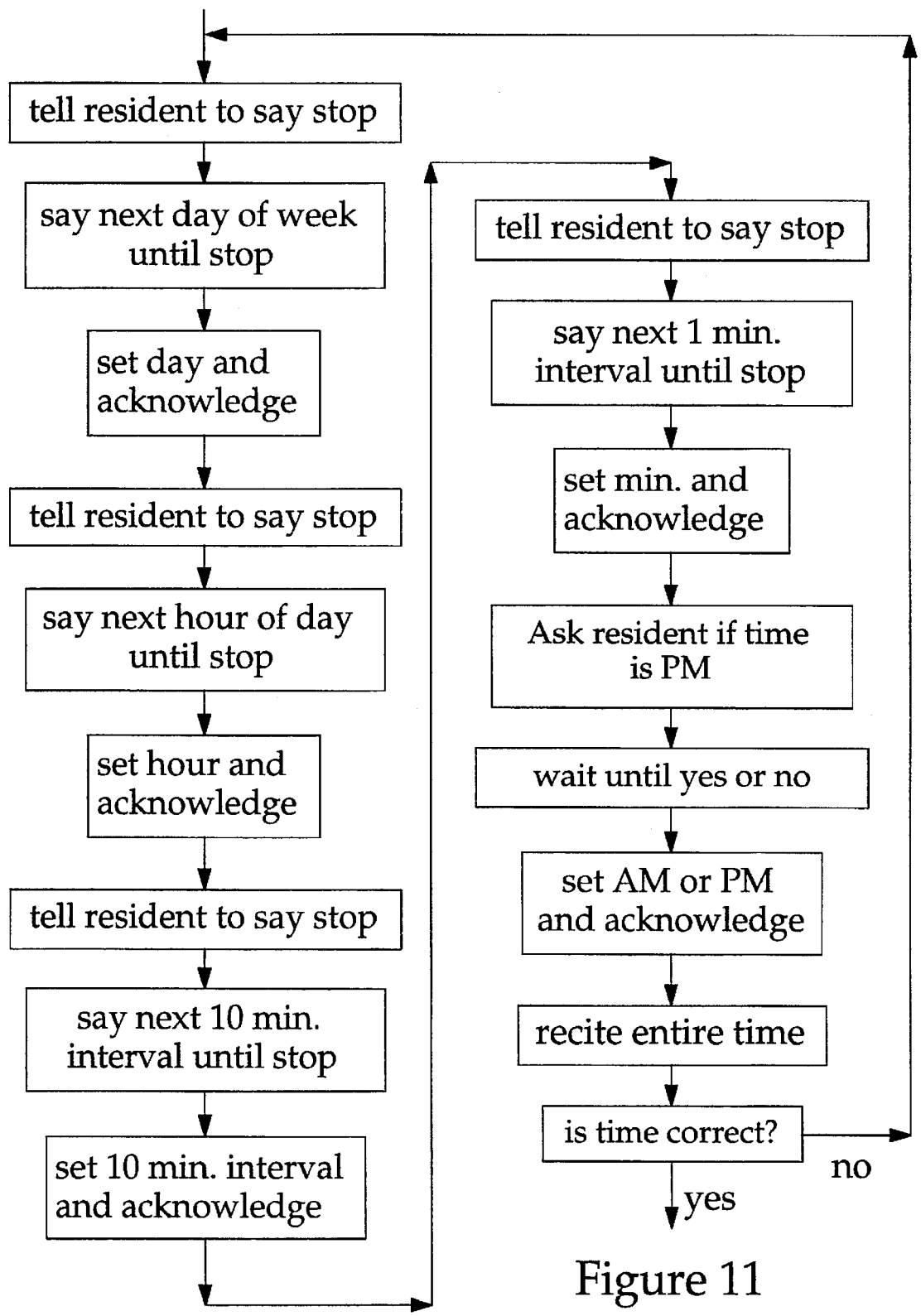
FIG. 11 is a flow diagram of the time set script according to the invention.

FIG. 11 is a flowchart of the time script. The unit asks the resident to say "stop" after the correct day of the week is spoken and then sequentially plays the days of the week, "Monday, Tuesday, . . ." When "stop" is spoken, the day is appropriately set. The hour of day is set similarly by sequentially playing "one, two, . . . , twelve" and waiting for the resident to say "stop". The minute is set in two steps. The first step sequentially plays the ten-minute intervals "zero, ten, twenty, . . . , fifty" and the second step sequentially plays the minute within the selected interval "zero, one, two, . . . nine". Finally, "PM?" is played and the resident says either "yes" or "no". The set time is then played back and the resident is asked to confirm that it has been correctly set. If it is correct, the script ends. Otherwise, it returns to the beginning.

Figure 12:
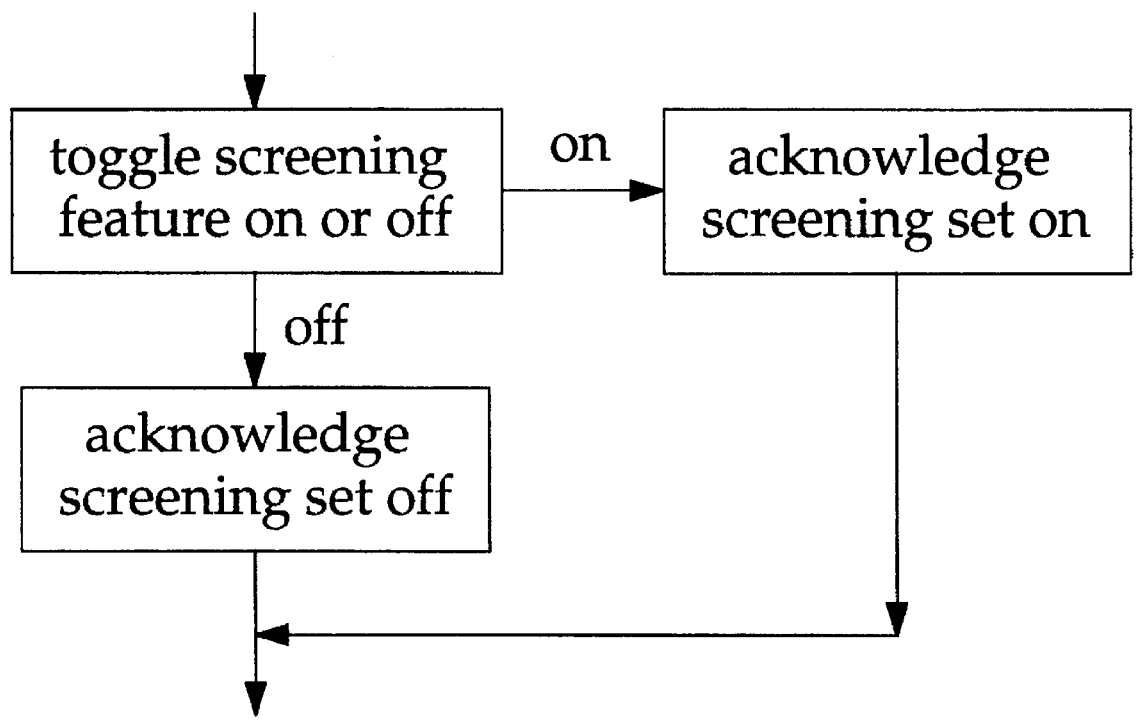
FIG. 12 is a flow diagram of the screen set script according to the invention.

A flow chart for the screen script is shown in FIG. 12. The unit toggles the state of the screening feature and the system acknowledges the state by playing "screening is now on" or "screening is now off." A similar script, activated by the command "date stamp", turns the date stamp feature on and off. It is obvious to one skilled in the art that these scripts can be modified in many ways and new scripts can be added to permit control of other features of the system, limited only by the available memory.

In another embodiment of the invention, the interior unit is portable and battery powered, giving the unit added convenience. In a variation on this embodiment, the unit can be integrated in the same casing as a common TV or VCR remote control unit.

In another embodiment, the interior unit has a volume control so that the resident can control the loudness of the broadcasting.

In another embodiment of the invention, the interior unit is interfaced with a telephone. This interface can permit the resident to retrieve messages remotely in much the same way that common telephone answering machines permit messages to be retrieved remotely. In a variation on this embodiment, the system also functions as a telephone answering machine, answering the telephone and taking messages from callers in much the same way that it takes messages from visitors at the door. In this case, the interior unit functions as a speaker phone when the broadcast feature is turned on.

In another embodiment of the invention, the exterior unit has a proximity sensor that is capable of sensing the physical presence of visitors nearby. This sensor then serves to activate the exterior event script.

In another embodiment of the invention, the exterior unit has speech recognition and synthesis circuitry similar to that in the interior unit. This permits the exterior unit to interact with visitors without necessarily communicating with the interior unit.

Other embodiments of the invention include differing amounts of memory. More expensive units can be produced having more memory and thus a wider vocabulary for speech recognition and synthesis. Alternatively, less expensive units can be produced having less memory and thus a more limited vocabulary. For example, an inexpensive embodiment of the invention might not have interactivity with the resident, or may interact with speech synthesis only.

In another embodiment of the invention, the system plays music on the speaker of the exterior unit during delay periods of scripts that allow time for the resident to answer the door.

In another embodiment of the invention, the RF communications link between the interior unit and the exterior unit is replaced with an electronic wire link.

In another embodiment, the door sensor is replaced by a proximity sensor for sensing the physical proximity of the resident on the inside.

In another embodiment, the system also includes a door-release mechanism connected to the exterior unit. If the appropriate command is given by the resident, the system can unlock the door, permitting the visitor to enter.

In yet another embodiment, the system includes a proximity sensor on the interior unit that senses the physical proximity of the resident, enabling the unit to automatically prompt the resident for a command. Such a proximity sensor could be, for example, a miniature radar, an infrared sensor, or a sonar.

In another embodiment of the invention, the interior unit has one or more additional buttons for setting the time.

It will be clear to one skilled in the art that the above embodiments may be altered in many ways without departing from the scope of the invention. Accordingly, the scope of the invention should be determined by the following claims and their legal equivalents.

I claim:

1. A communication and messaging system for use between an interior space and an exterior space separated by a wall, the system comprising:

exterior sensing means for recognizing the presence of a visitor in the exterior space and generating a activation signal for activating the system;

speech generation means for posing a prompting question to the visitor, the prompting question determined by a dialogue script;

record and playback means for digitally recording and playing back a message spoken by the visitor;

interior broadcast means for broadcasting in the interior space a sound chosen from the group consisting of words spoken by the visitor, the prompting question posed by the speech generation means, and the message spoken by the visitor;

exterior broadcast means for broadcasting in the exterior space words spoken by a resident in the interior space;

control means responsive to the exterior sensing means and to the dialogue script, for controlling the speech generation means, the record and playback means, and the interior broadcast means;

interior sensing means for recognizing the presence of the resident in the interior space;

second speech generation means, not necessarily distinct from the speech generation means, for posing a second prompting question to the resident, the second prompting question determined by a second dialogue script;

wherein the control means is further responsive to the second dialogue script and the interior sensing means, for further controlling the second speech generation means.

2. The system of claim 1 further comprising a first speech recognition means for recognizing a verbal response spoken by the visitor, and wherein the control means is further responsive to the first speech recognition means.

3. The system of claim 1 wherein the system is divided into an interior unit located in the interior space and an exterior unit located in the exterior space and wherein the system further comprises a communication means for transmitting a signal between the interior unit and the exterior unit.

4. The system of claim 3 wherein the communication means is chosen from the group consisting of a radio frequency link and a wire link.

5. The system of claim 3 wherein the signal comprises a signal chosen from the group consisting of a control signal, the prompting question, the verbal response, the message, the words spoken by the visitor, and the words spoken by the resident.

6. The system of claim 3 wherein the interior unit comprises a volume control means for controlling the volume of the interior broadcast means.

7. The system of claim 3 wherein the interior unit is portable.

8. The system of claim 7 wherein the interior unit comprises a remote control device.

9. The system of claim 1 further comprising an interior button located in the interior space for the resident to push; and wherein the control means is further responsive to the interior button.

10. The system of claim 9 further comprising a telephone interface for establishing communication between the system and a telephone and wherein the control means is further responsive to the telephone interface.

11. The system of claim 1 wherein the record and playback means is further used for digitally recording and playing back an outgoing message spoken by the resident; and wherein the exterior broadcast means is used further for broadcasting in the exterior space the outgoing message.

12. The system of claim 2 further comprising a second speech recognition means, not necessarily distinct from the first speech recognition means, for recognizing a verbal command spoken by the resident; and wherein the control means is further responsive to the second speech recognition means.

13. The system of claim 1 wherein the second speech generation means is chosen from the group consisting of a speech synthesizer and a digital recording played on the record and playback means.

14. The system of claim 1 wherein the speech generation means is chosen from the group consisting of a speech synthesizer and a digital recording played on the record and playback means.

15. The system of claim 1 wherein the control means controls the interior broadcast means to broadcast a doorbell sound in response to the sensing means.

16. The system of claim 1 wherein the sensing means is chosen from the group consisting of an exterior button for the visitor to push and a proximity sensor positioned in the exterior space.

17. The system of claim 1 further comprising a door sensing means for sensing an open/closed state of a door connecting the interior space and the exterior space, and wherein the control means is further responsive to the door sensing means.

18. The system of claim 1 further comprising a music synthesis means for generating music in the exterior space.

19. The system of claim 1 wherein the record and playback means comprises a clock for recording a time at which the message is recorded, and wherein the speech generation means is further used for verbally announcing the time.

20. The system of claim 19 wherein the dialogue script includes a time script for setting the clock, the time script comprising instructions to play a list of times until the resident interrupts the playing of the list.

21. The system of claim 20 wherein the resident interrupts the playing of the list by saying a predetermined word.

22. The system of claim 20 wherein the resident interrupts the playing of the list by pressing an interior button.

23. The system of claim 1 wherein the system comprises a single integrated circuit for performing speech synthesis, music synthesis, speech recognition, and digital audio recording and playback.

24. A communication and messaging system for use between an interior space and an exterior space separated by a wall, the system comprising:

exterior sensing means for recognizing the presence of a visitor in the exterior space and generating a activation signal for activating the system;

speech generation means for posing a prompting question to the visitor, the prompting question determined by a dialogue script;

record and playback means for digitally recording and playing back a message spoken by the visitor;

interior broadcast means for broadcasting in the interior space a sound chosen from the group consisting of words spoken by the visitor, the prompting question posed by the speech generation means, and the message spoken by the visitor;

exterior broadcast means for broadcasting in the exterior space words spoken by a resident in the interior space;

control means responsive to the exterior sensing means and to the dialogue script, for controlling the speech generation means, the record and playback means, and the interior broadcast means;

interior sensing means for recognizing the presence of the resident in the interior space;

wherein the control means is further responsive to the interior sensing means.

* * * * *